United States Patent
Rosario

(10) Patent No.: US 9,333,821 B1
(45) Date of Patent: May 10, 2016

(54) LOCK DOWN HITCH BALL SYSTEM

(71) Applicant: Israel Rosario, West Hollywood, FL (US)

(72) Inventor: Israel Rosario, West Hollywood, FL (US)

( * ) Notice: Subject to any disclaimer, the term of this patent is extended or adjusted under 35 U.S.C. 154(b) by 0 days.

(21) Appl. No.: 14/484,765

(22) Filed: Sep. 12, 2014

Related U.S. Application Data

(60) Provisional application No. 61/958,531, filed on Sep. 19, 2013.

(51) Int. Cl.
*B60D 1/28* (2006.01)
*B60D 1/06* (2006.01)
*B60D 1/46* (2006.01)

(52) U.S. Cl.
CPC .. *B60D 1/28* (2013.01); *B60D 1/06* (2013.01); *B60D 1/46* (2013.01)

(58) Field of Classification Search
CPC ............. B60D 1/06; B60D 1/28; B60D 1/46; B60D 1/60
See application file for complete search history.

(56) References Cited

U.S. PATENT DOCUMENTS

| | | | | |
|---|---|---|---|---|
| 4,291,893 A | * | 9/1981 | Hansen | 280/507 |
| 5,087,064 A | * | 2/1992 | Guhlin | 280/507 |
| 5,433,467 A | * | 7/1995 | Easterwood | 280/507 |
| 7,347,441 B2 | * | 3/2008 | Rosario | 280/507 |

* cited by examiner

*Primary Examiner* — Kevin Hurley

(57) ABSTRACT

A ball/lock component formed with a C-shaped central section having horizontal upper and lower legs. A ball extends upwardly from the lower leg. A bolt is threadedly received in the upper leg. The bolt is axially movable toward and away from the ball. An adjustment collar is attached to the bolt for rotating the bolt. An attachment leg extends forwardly from the central section and has a horizontal bore. A support component has vertical walls with vertically spaced adjustment apertures extending there through. An adjustment rod extends through selected aperture pairs. The support component has a coupling leg. A support bore extends through the coupling leg.

6 Claims, 8 Drawing Sheets

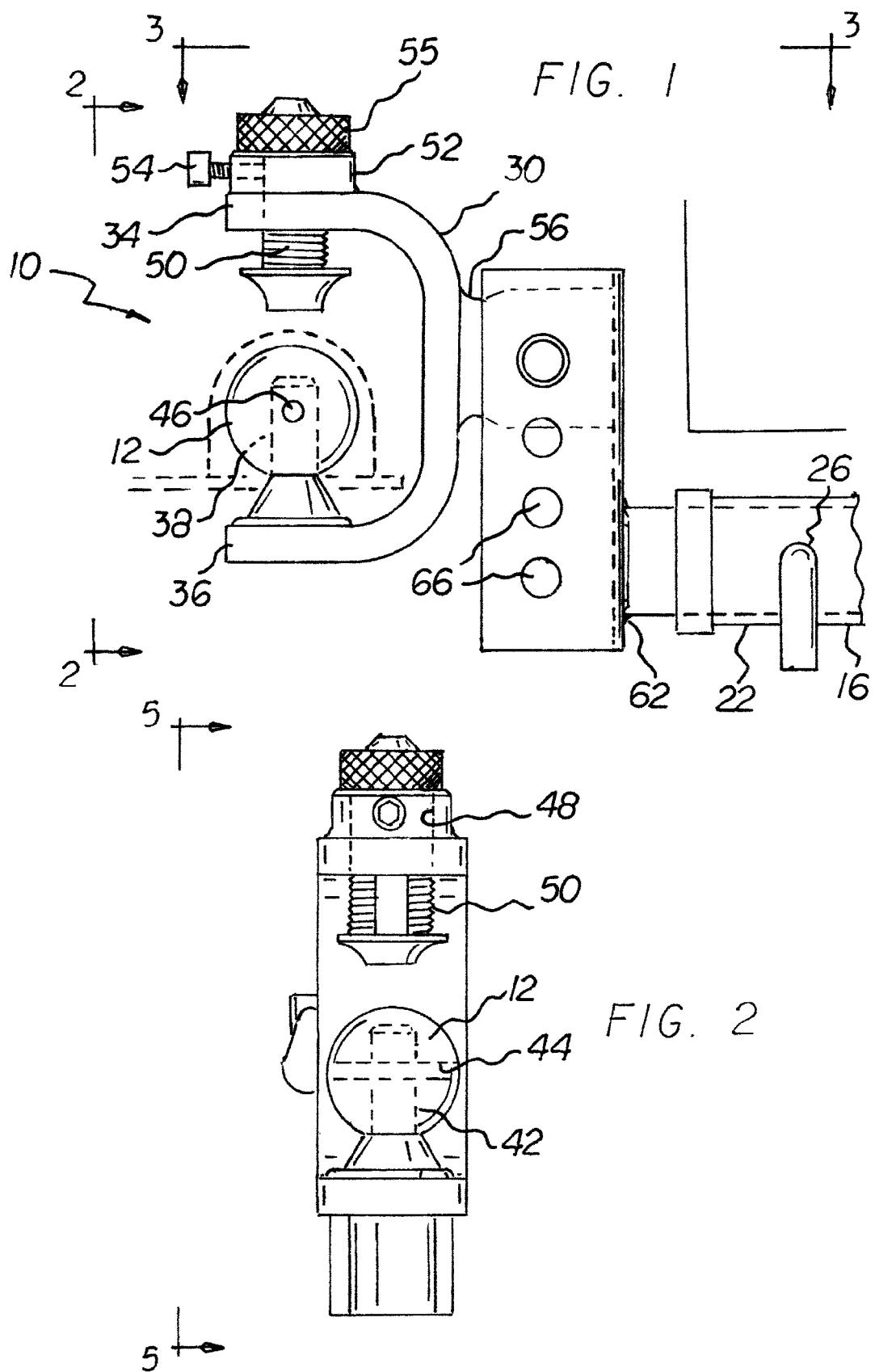

LOCK DOWN HITCH BALL SYSTEM

BACKGROUND OF THE INVENTION

1. Related Application

The present application is based upon Provisional Application No. 61/958,531 filed Sep. 19, 2013, the subject matter of which is incorporated herein by reference.

2. Field of the Invention

The present invention relates to a lock down hitch ball system and more particularly pertains to receiving a trailer component on a ball, locking down the trailer component on the ball, and coupling the ball and trailer component to a towing vehicle. The receiving, the locking down, and the coupling being done in a safe, convenient, and economic manner.

DESCRIPTION OF THE PRIOR ART

The use of hitch ball systems of known designs and configurations is known in the prior art. More specifically, hitch ball systems of known designs and configurations previously devised and utilized for the purpose of coupling a ball and trailer component to a towing vehicle are known to consist basically of familiar, expected, and obvious structural configurations, notwithstanding the myriad of designs encompassed by the crowded prior art which has been developed for the fulfillment of countless objectives and requirements.

While these devices fulfill their respective, particular objectives and requirements, they do not describe a lock down hitch ball system that allows receiving a trailer component on a ball, locking down the trailer component on the ball, and coupling the ball and trailer component to a towing vehicle.

In this respect, the lock down hitch ball system according to the present invention substantially departs from the conventional concepts and designs of the prior art, and in doing so provides an apparatus primarily developed for the purpose of receiving a trailer component on a ball, locking down the trailer component on the ball, and coupling the ball and trailer component to a towing vehicle.

Therefore, it can be appreciated that there exists a continuing need for a new and improved lock down hitch ball system which can be used for receiving a trailer component on a ball, locking down the trailer component on the ball, and coupling the ball and trailer component to a towing vehicle. In this regard, the present invention substantially fulfills this need.

SUMMARY OF THE INVENTION

In view of the foregoing disadvantages inherent in the known types of hitch ball systems of known designs and configurations now present in the prior art, the present invention provides an improved lock down hitch ball system. As such, the general purpose of the present invention, which will be described subsequently in greater detail, is to provide a new and improved lock down hitch ball system and method which has all the advantages of the prior art and none of the disadvantages.

To attain this, from a broad standpoint, the present invention essentially comprises a ball/lock component formed with a C-shaped central section having horizontal upper and lower legs. A ball extends upwardly from the lower leg. A bolt is threadedly received in the upper leg. The bolt is axially movable toward and away from the ball. An adjustment collar is attached to the bolt for rotating the bolt. An attachment leg extends forwardly from the central section and has a horizontal bore. A support component has vertical walls with vertically spaced adjustment apertures extending there through. An adjustment rod extends through selected aperture pairs. The support component has a coupling leg. A support bore extends through the coupling leg.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved lock down hitch ball system which has all of the advantages of the prior art hitch ball systems of known designs and configurations and none of the disadvantages.

It is another object of the present invention to provide a new and improved lock down hitch ball system which may be easily and efficiently manufactured and marketed.

It is further object of the present invention to provide a new and improved lock down hitch ball system which is of durable and reliable constructions.

An even further object of the present invention is to provide a new and improved lock down hitch ball system which is susceptible of a low cost of manufacture with regard to both materials and labor, and which accordingly is then susceptible of low prices of sale to the consuming public, thereby making such lock down hitch ball system economically available to the buying public.

Lastly, another object of the present invention is to provide a lock down hitch ball system for receiving a trailer component on a ball, locking down the trailer component on the ball, and coupling the ball and trailer component to a towing vehicle. The receiving, the locking down, and the coupling are done in a safe, convenient and economic manner.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side elevational view of a lock down hitch ball system constructed in accordance with the principles of the present invention.

FIG. 2 is a front elevational view taken along line 2-2 of FIG. 1.

The same reference numerals refer to the same parts throughout the various Figures.

DESCRIPTION OF THE PREFERRED EMBODIMENT

Figure 3:
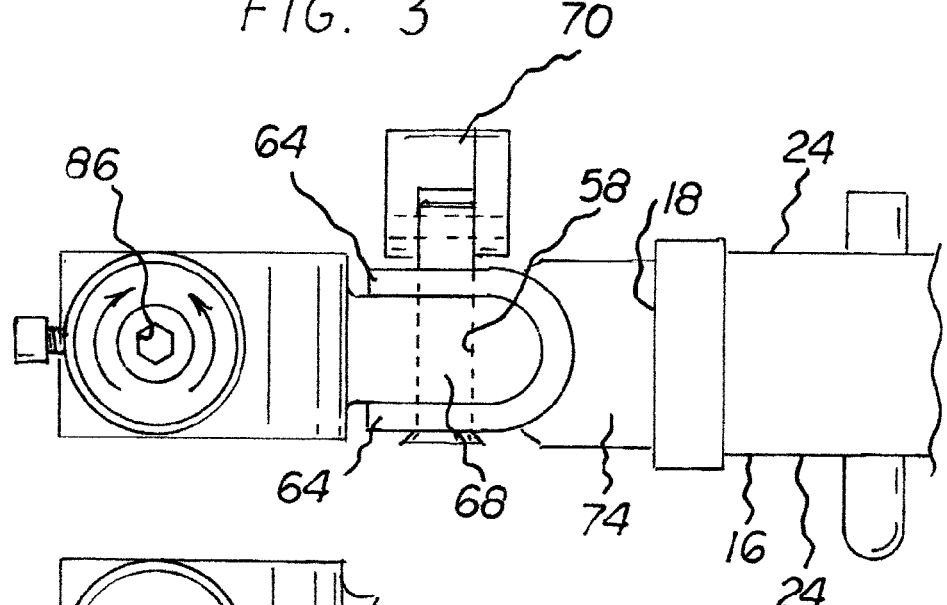
FIG. 3 is a plan view taken along line 3-3 of FIG. 1.
Figure 4:
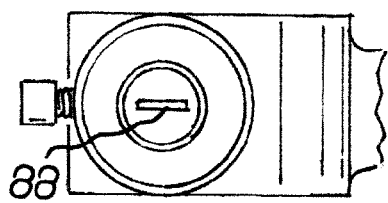
FIG. 4 is a plan view similar to FIG. 3 but illustrating a lock variation of the invention.
Figure 5:
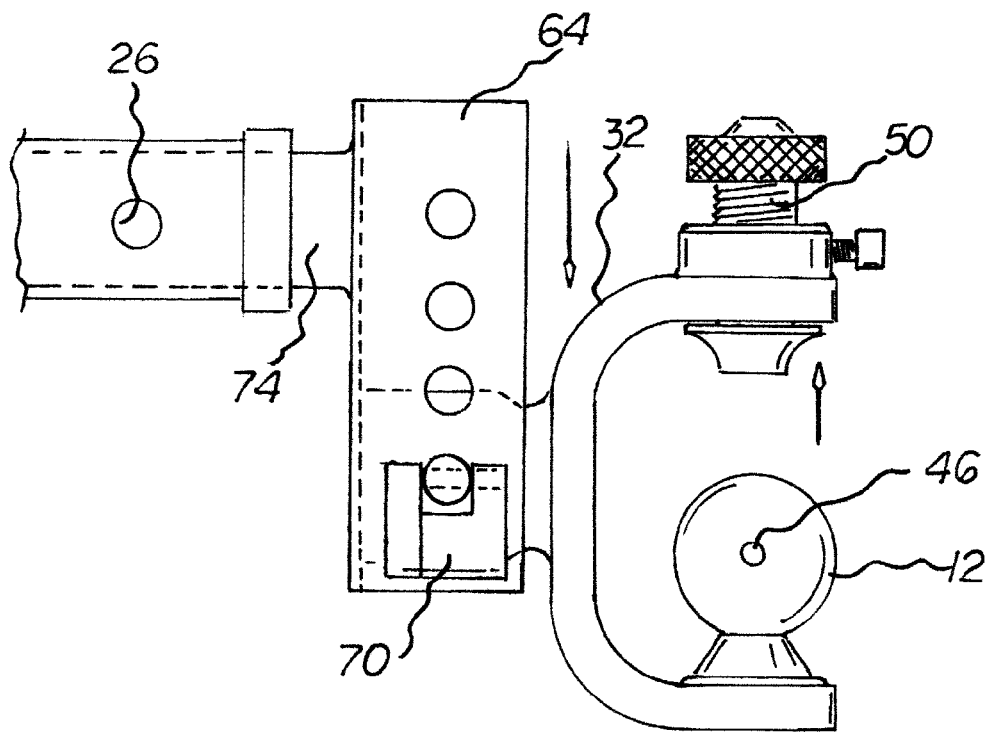
FIG. 5 is a side elevational view taken along line 5-5 of FIG. 2.
Figure 6:
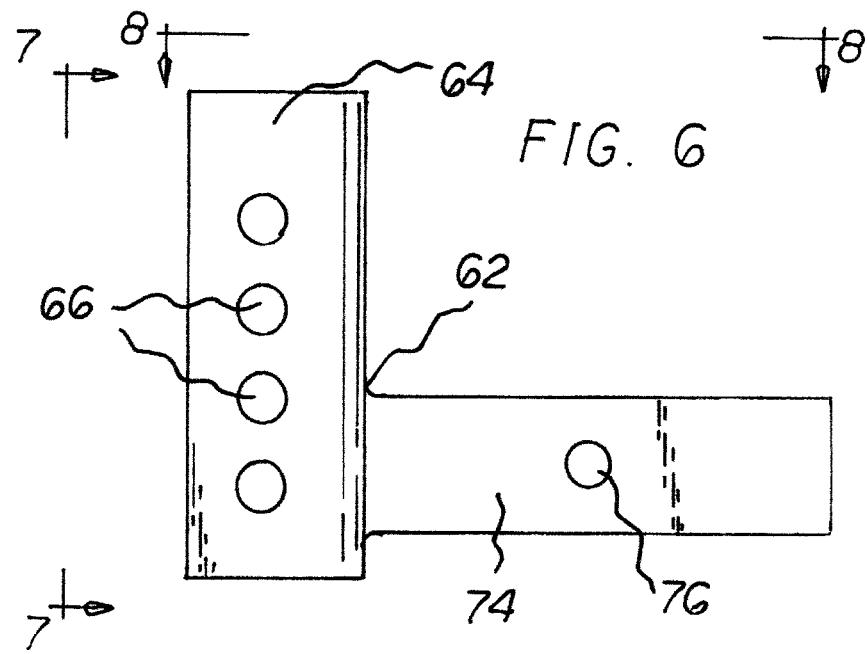
FIG. 6 is side elevational view of the support component illustrated in FIG. 1.
Figure 7:
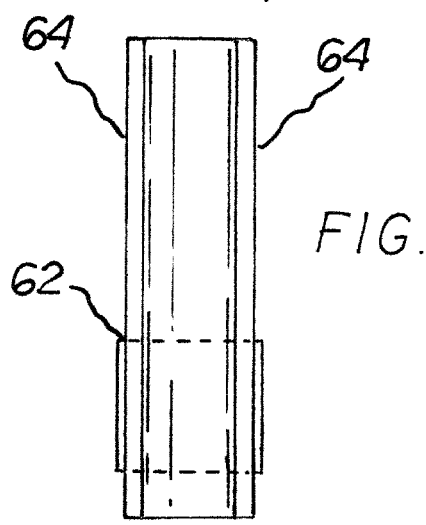
FIG. 7 is a front elevational view taken along line 7-7 of FIG. 6.
Figure 8:
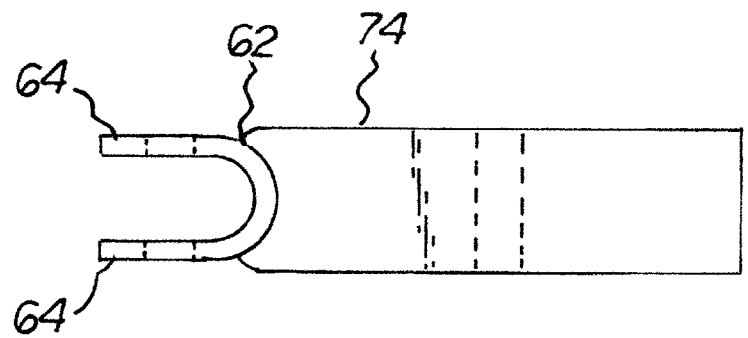
FIG. 8 is a plan view taken along line 8-8 of FIG. 6.
Figure 9:
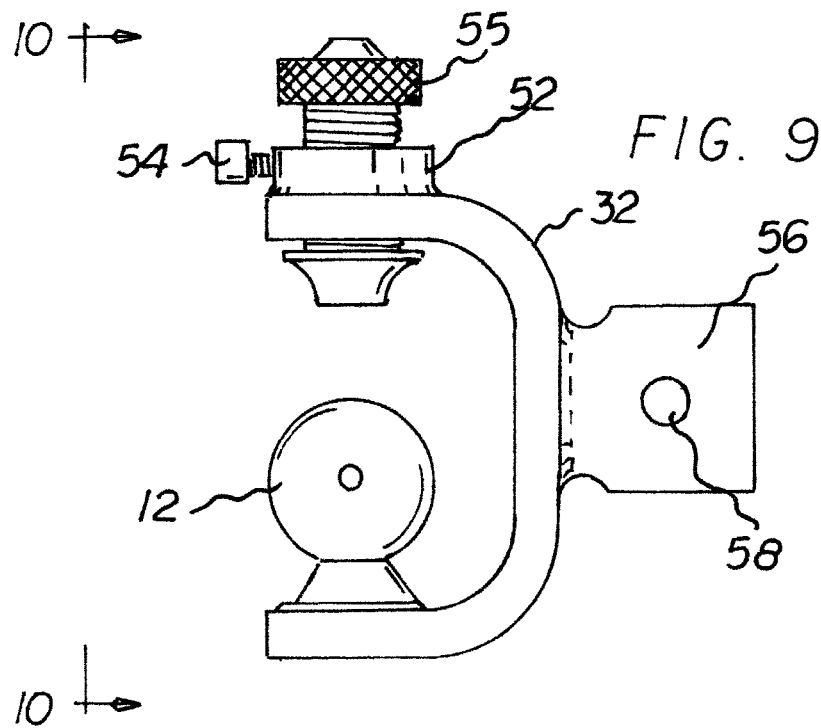
FIG. 9 is a side elevational view of the ball/lock component shown in FIG. 1.
Figure 10:
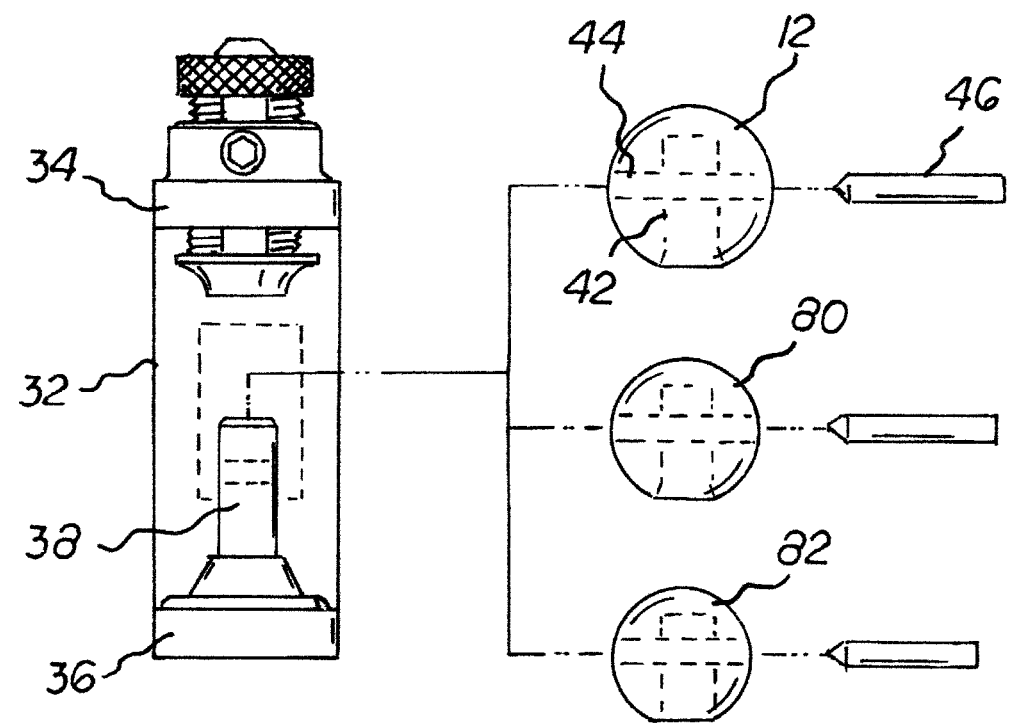
FIG. 10 is a front elevational view taken along line 10-10 of FIG. 9.

With reference now to the drawings, and in particular to FIG. 1 thereof, the preferred embodiment of the new and improved lock down hitch ball system embodying the principles and concepts of the present invention and generally designated by the reference numeral 10 will be described.

The present invention, the lock down hitch ball system 10 is comprised of a plurality of components. Such components in their broadest context include a ball/lock component, a ball, a bolt, an adjustment collar, an attachment leg, and a support component. Such components are individually configured and correlated with respect to each other so as to attain the desired objective.

From a specific standpoint, the lock down hitch ball system 10 of the prevent invention is for receiving a trailer component on a ball 12, for locking down the trailer component on the ball, and for coupling the ball and trailer component to a towing vehicle. The receiving, locking down, and coupling are done in a safe, convenient, and economic manner.

First provided is a receiver component 16 formed in a hollow tubular configuration with a rearwardly facing opening 18. The receiver component has a square cross sectional configuration with a horizontal central axis. The receiver component is formed of an upper face 20, a lower face 22, and side faces 24. The side faces have aligned receiver apertures 26 equally spaced from the upper and lower faces.

Next provided is a ball/lock component 30 formed with a central section 32 having a C-shaped cross sectional configuration. The central section has a horizontal upper leg 34 and a horizontal lower leg 36. The horizontal upper and horizontal lower legs extend rearwardly. A vertical post 38 extends upwardly from the horizontal lower leg. A radial bore 42 formed in the ball 12 receives the vertical post. A diametric aperture 44 extends horizontally through the ball and the vertical post.

Next provided is a ball pin 46 positioned through the diametric aperture removably coupling the ball to the vertical post. A threaded aperture 48 extends vertically through the horizontal upper leg in alignment with the ball and the vertical post.

A bolt 50 is next provided. The bolt is threadedly received in the threaded aperture. The bolt has a lower end axially movable between a lower position and an upper position. The lower position locks the trailer component to the ball. The upper position allows movement of the trailer component with respect to the ball.

A locking collar 52 is provided next. The locking collar is attached above to the horizontal upper leg. A locking pin 54 is adapted to rotationally secure the bolt to the horizontal upper leg.

Next provided is an adjustment collar 55 located above and aligned with the locking collar. The adjustment collar is attached to the bolt. The adjustment collar has a knurled surface to facilitate grasping and rotation of the bolt.

An attachment leg 56 is next provided. The attachment leg extends forwardly from the central section and is equally spaced between the horizontal upper and lower legs. The attachment leg has a horizontal bore 58.

Next provided is a support component 62 removably positioned between the central section 32 of the ball/lock component 30 and the receiver component. The support component has a rotated U-shaped section with vertical walls 64 spanning the attachment leg of the central section. Vertically spaced adjustment apertures 66 extend through the vertical walls. An adjustment rod 68 with a pivoted securement tab 70 extends through the horizontal bore 58 and selected adjustment apertures 66 to couple the ball to the support component at a desired height.

The support component has a coupling leg 74 with a square cross sectional configuration. A support bore 76 extends horizontally through the coupling leg. The coupling leg extends rearwardly from the U-shaped section. A support rod extends through the receiver apertures 26 and the support bore 76 for separable securement purposes.

A plurality of supplemental balls 80, 82 are next provided. The ball and the supplemental balls are of varying sizes and are selectively positionable on the vertical post to accommodate trailer components of varying sizes.

Next, a socket head recess 86 is provided in the adjustment collar 55. The socket head recess facilitates rotating the bolt 50.

Lastly, in this embodiment, a lock with a keyhole 90 is next provided in the adjustment collar to facilitate locking the bolt.

Figure 11:
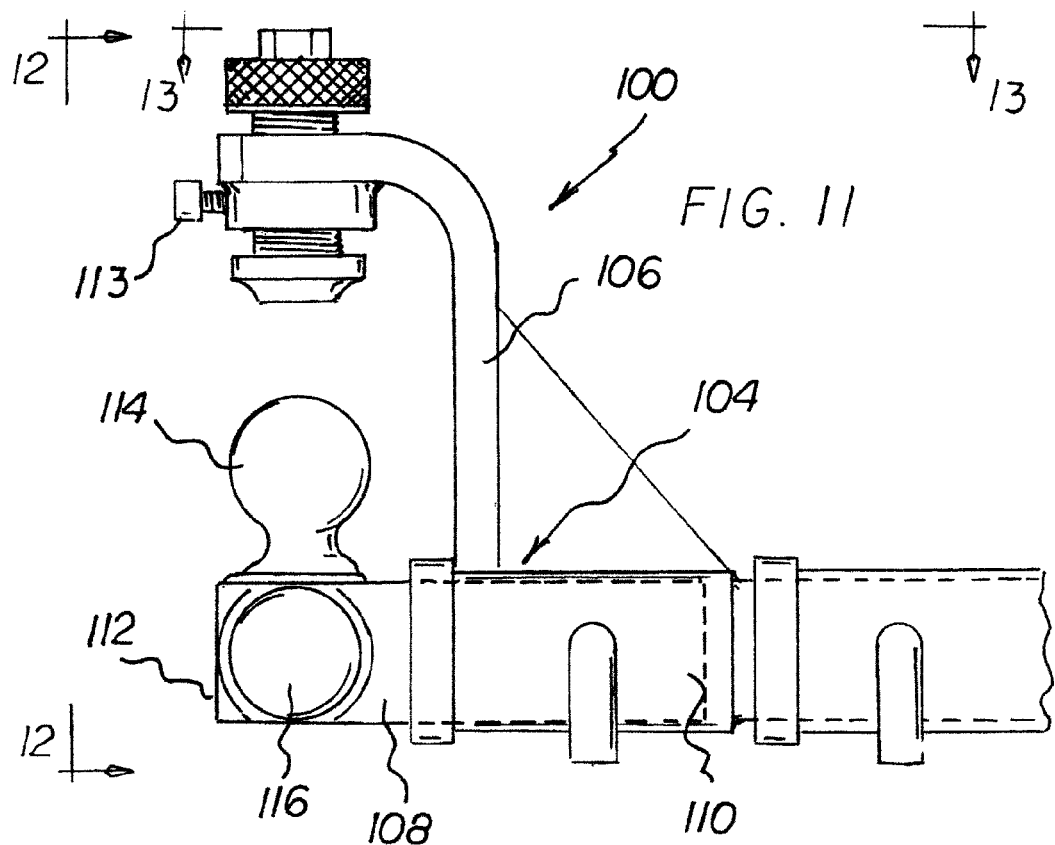
FIG. 11 is a side elevational view of a lock down hitch ball system constructed in accordance with an alternate embodiment of the present invention.
Figure 12:
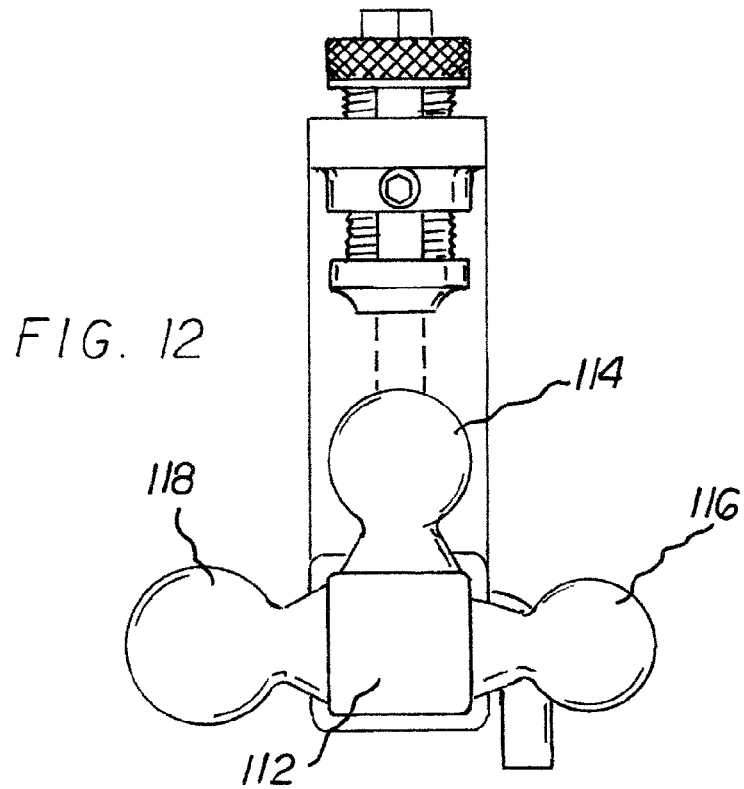
FIG. 12 is a front elevational view taken along line 12-12 of FIG. 11.
Figure 13:
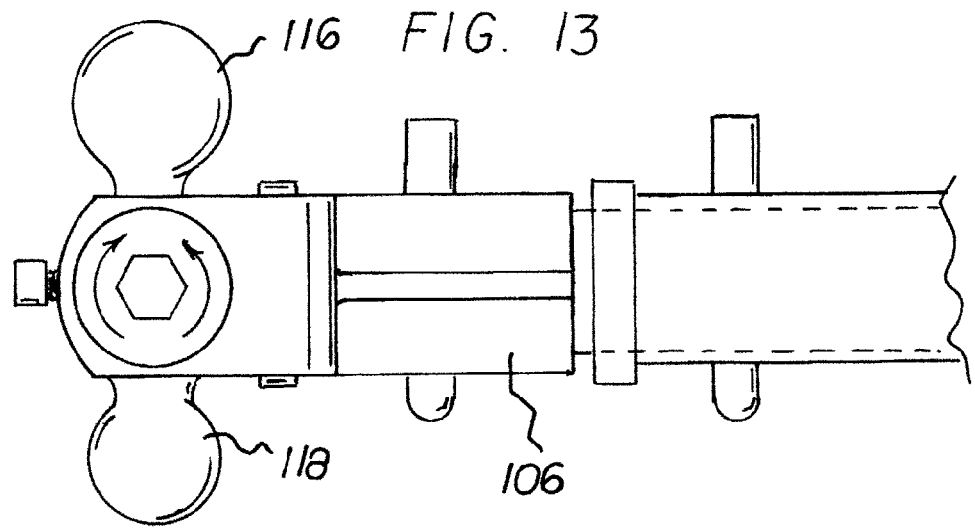
FIG. 13 is a plan view taken along line 13-13 of FIG. 11.
Figure 14:
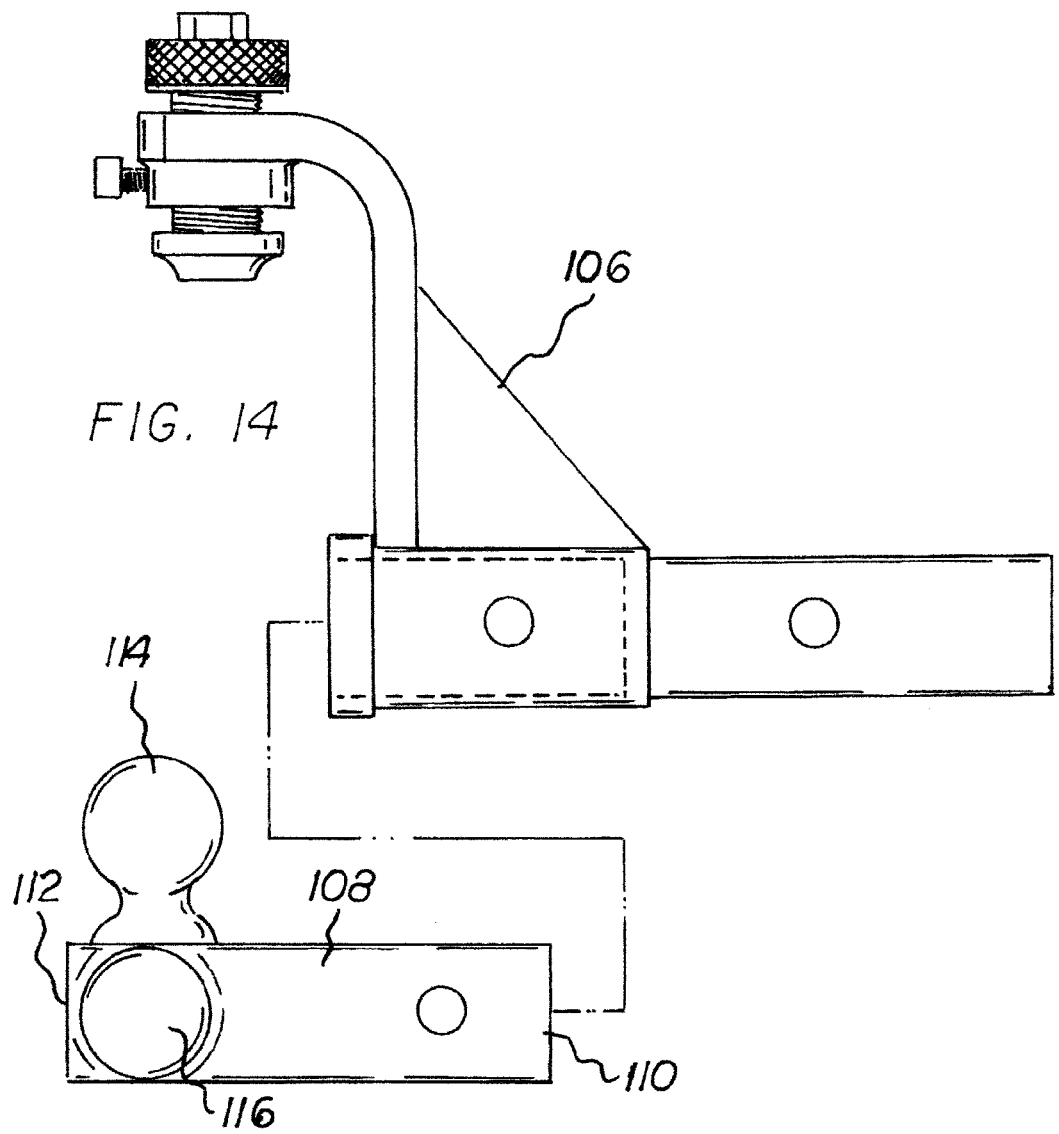
FIG. 14 is an exploded side elevational view similar to FIG. 11.

Reference is now made to FIGS. 11-14. In this embodiment of the system 100, the ball/lock component 104 includes a lock part 106 and a ball part 108. The ball part has a forward end 110 removably positionable in the lock part. The ball part has a rearward end 112 with a plurality of balls 114, 116, 118.

The balls are of varying sizes and are selectively positionable with respect to the lock part to accommodate trailer components of varying sizes.

Figure 15:
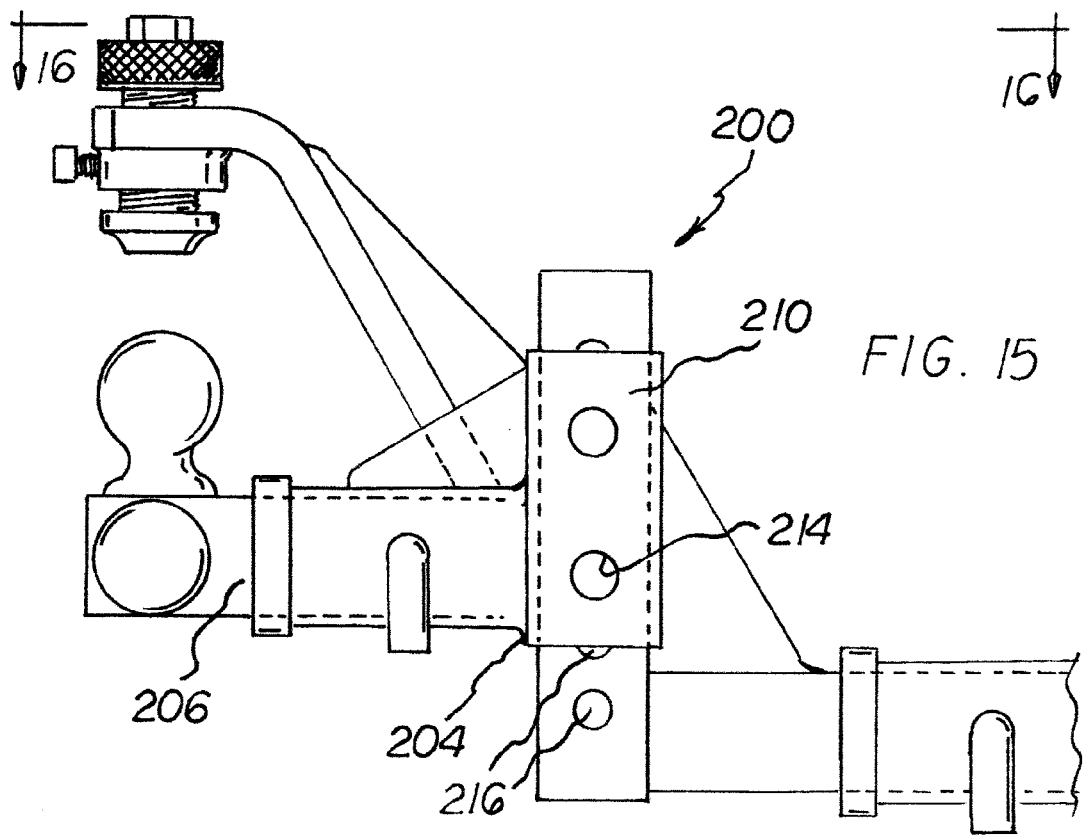
FIG. 15 is a side elevational view of a lock down hitch ball system constructed in accordance with an additional alternate embodiment of the present invention.
Figure 16:
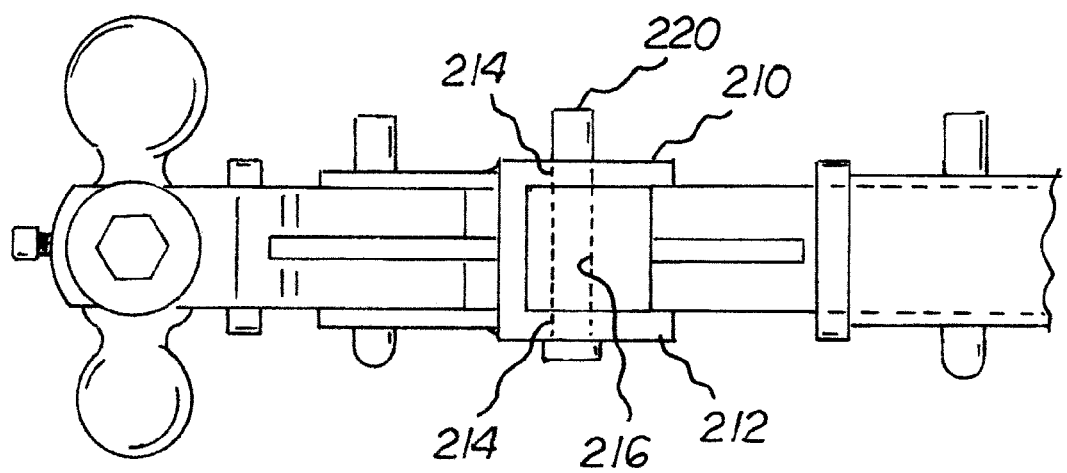
FIG. 16 is a plan view taken along line 16-16 of FIG. 15.
Figure 17:
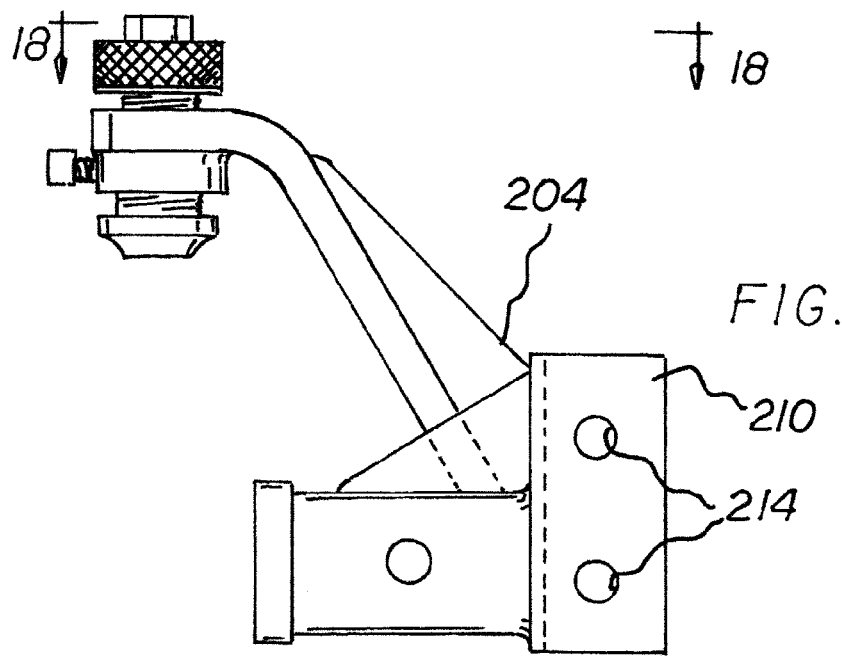
FIG. 17 is a side elevational view of the lock element illustrated in FIG. 15.
Figure 18:
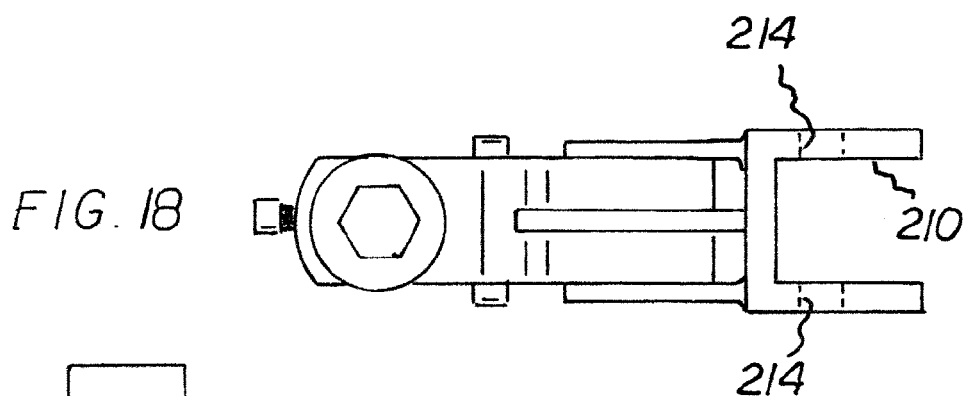
FIG. 18 is a plan view taken along line 18-18 of FIG. 17.
Figure 19:
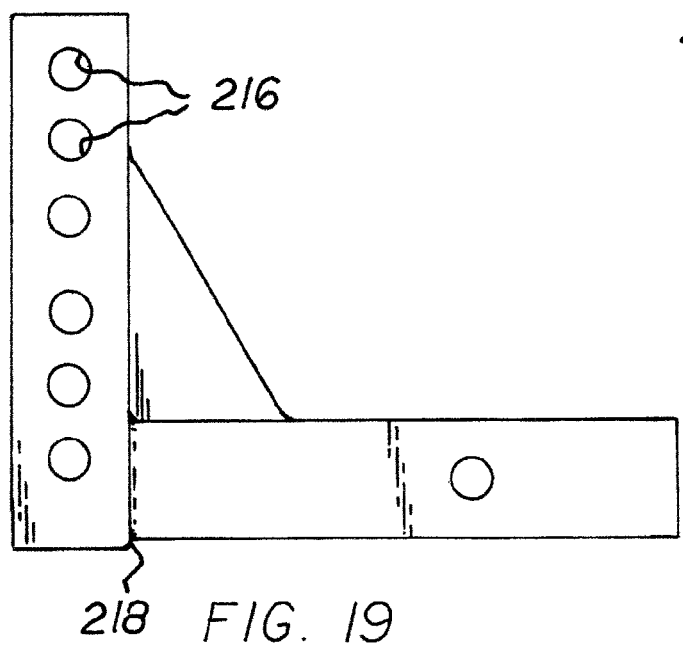
FIG. 19 is a side elevational view of the support component illustrated in FIG. 15.

Reference is now made to FIGS. 15-19. In this alternate embodiment of the system 200, the lock part 204 of the ball/lock component 206 includes the laterally spaced vertical walls 210, 212 which extend forwardly from the ball/lock component. The laterally spaced vertical walls have the adjustment aperture pairs 214 adapted to align with an associated aperture 216 in the support component 218 for height adjustment of the balls. The adjustment rod 220 extends through a selected adjustment aperture pair 214 of lock part 204 and an associated aperture 216 of the support component 218.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A lock down hitch ball system comprising:
   a ball/lock component formed with a central section having a C-shaped cross sectional configuration, the central section having horizontal upper and lower legs;
   a ball extending upwardly from the lower leg;
   a bolt threadedly received in the upper leg, the bolt axially movable toward and away from the ball;
   an adjustment collar attached to the bolt for rotating the bolt;
   an attachment leg extending forwardly from the central section, the attachment leg having a horizontal bore;
   a support component having vertical walls with vertically spaced adjustment aperture pairs extending through the vertical walls, an adjustment rod extending through selected aperture pairs; and
   the support component having a coupling leg, a support bore extending through the coupling leg.

2. The system (100) as set forth in claim 1 wherein the ball/lock component (104) includes a lock part (106) and a ball part (108), the ball part having a forward end (110) removably positionable in the lock part, the ball part having a rearward end (112) with a plurality of balls (114)(116)(118), the balls being of varying sizes and being selectively positionable with respect to the lock part to accommodate trailer components of varying sizes.

3. The system (200) as set forth in claim 2 wherein the lock part (204) of the ball/lock component (206) includes the laterally spaced vertical walls (210)(212), the laterally spaced vertical walls extending forwardly from the ball/lock component, the laterally spaced vertical walls having the adjustment aperture pairs (214) adapted to align with an associated aperture (216) in the support component (218) for height adjustment of the balls, the adjustment rod (220) extending through a selected adjustment aperture pair (214) of lock part (204) and an associated aperture (216) of the support component (218).

4. A lock down hitch ball system (10) for receiving a trailer component on a ball (12), for locking down the trailer component on the ball, and for coupling the ball and trailer component to a towing vehicle, the receiving and the locking down and the coupling being done in a safe, convenient and economic manner, the system comprising, in combination:
   a receiver component (16) formed in a hollow tubular configuration with a rearwardly facing opening (18), the receiver component having a square cross sectional configuration with a horizontal central axis, the receiver component being formed of an upper face (20) and a lower face (22) and side faces (24), the side faces having aligned receiver apertures (26) equally spaced from the upper and lower faces;
   a ball/lock component (30) formed with a central section (32) having a C-shaped cross sectional configuration, the central section having a horizontal upper leg (34) and a horizontal lower leg (36), the horizontal upper and horizontal lower legs extending rearwardly, a vertical post (38) extending upwardly from the horizontal lower leg, a radial bore (42) formed in the ball (12) receiving the vertical post, a diametric aperture (44) extending horizontally through the ball and the vertical post;
   a ball pin (46) positioned through the diametric aperture removably coupling the ball to the vertical post, a threaded aperture (48) extending vertically through the horizontal upper leg in alignment with the ball and the vertical post;
   a bolt (50) threadedly received in the threaded aperture, the bolt having a lower end axially movable between a lower position and an upper position, the lower position locking the trailer component to the ball, the upper position allowing movement of the trailer component with respect to the ball;
   a locking collar (52) attached above to the horizontal upper leg, a locking pin (54) adapted to rotationally secure the bolt to the horizontal upper leg;
   an adjustment collar (55) located above and aligned with the locking collar, the adjustment collar attached to the bolt, the adjustment collar having a knurled surface to facilitate grasping and rotation of the bolt;
   an attachment leg (56) extending forwardly from the central section equally spaced between the horizontal upper and lower legs, the attachment leg having a horizontal bore (58);
   a support component (62) removably positioned between the central section (32) of the ball/lock component (30) and the receiver component, the support component having a rotated U-shaped section with vertical walls (64) spanning the attachment leg of the central section, vertically spaced adjustment apertures (66) extending through the vertical walls, an adjustment rod (68) with a pivoted securement tab (70) extending through the horizontal bore (58) and selected adjustment apertures (66) to couple the ball to the support component at a desired height;
   the support component having a coupling leg (74) with a square cross sectional configuration and a support bore (76) extending horizontally through the coupling leg, the coupling leg extending rearwardly from the U-shaped section, a support rod extending through the receiver apertures (26) and the support bore (76) for separable securement purposes; and a plurality of supplemental balls (80)(82), the ball and the supplemental balls being of varying sizes and being selectively positionable on the vertical post to accommodate trailer components of varying sizes.

5. The system as set forth in claim 4 and further including a socket head recess (86) in the adjustment collar (55) to facilitate rotating the bolt (50).

6. The system as set forth in claim 4 and further including a lock with a keyhole (90) in the adjustment collar to facilitate locking the bolt.

* * * * *